R. E. SMITH & F. E. CABLE.
MACHINE FOR MAKING CAPSULES.
APPLICATION FILED OCT. 19, 1912.

1,232,112.

Patented July 3, 1917.
8 SHEETS—SHEET 2.

Fig-2-

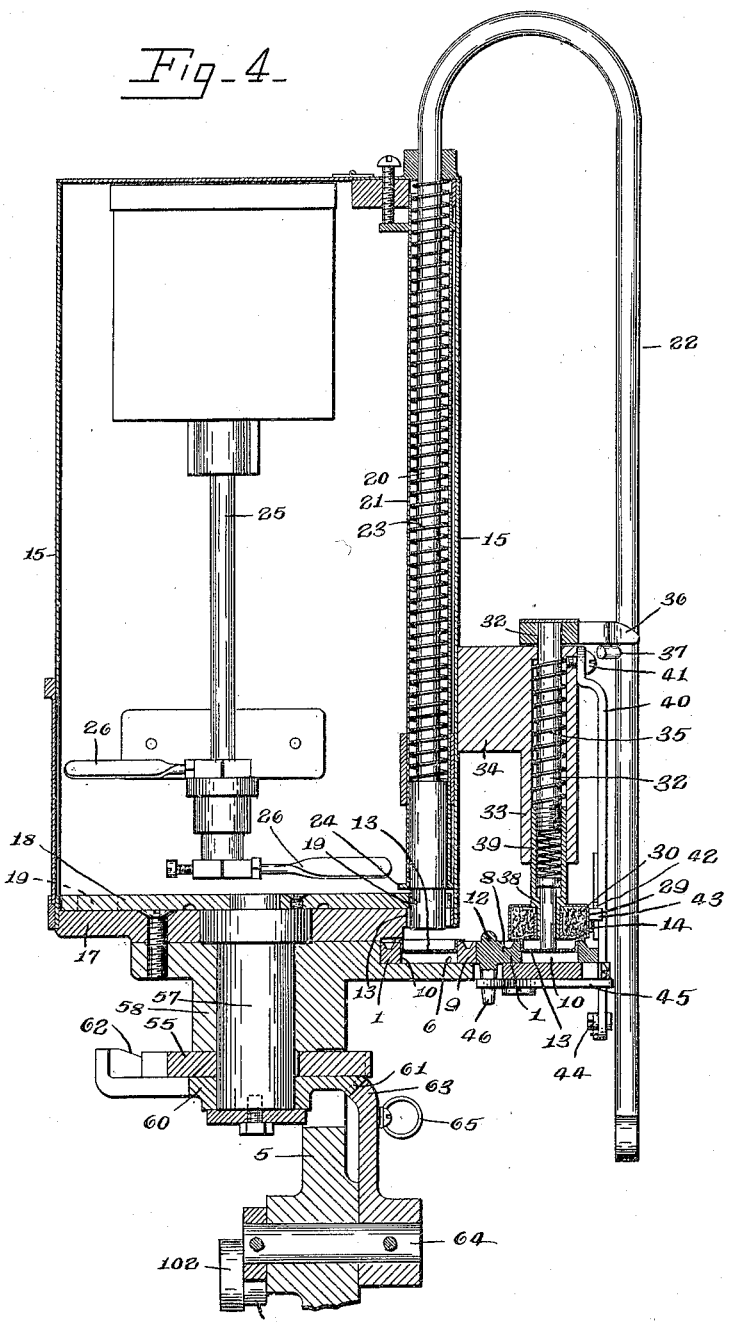

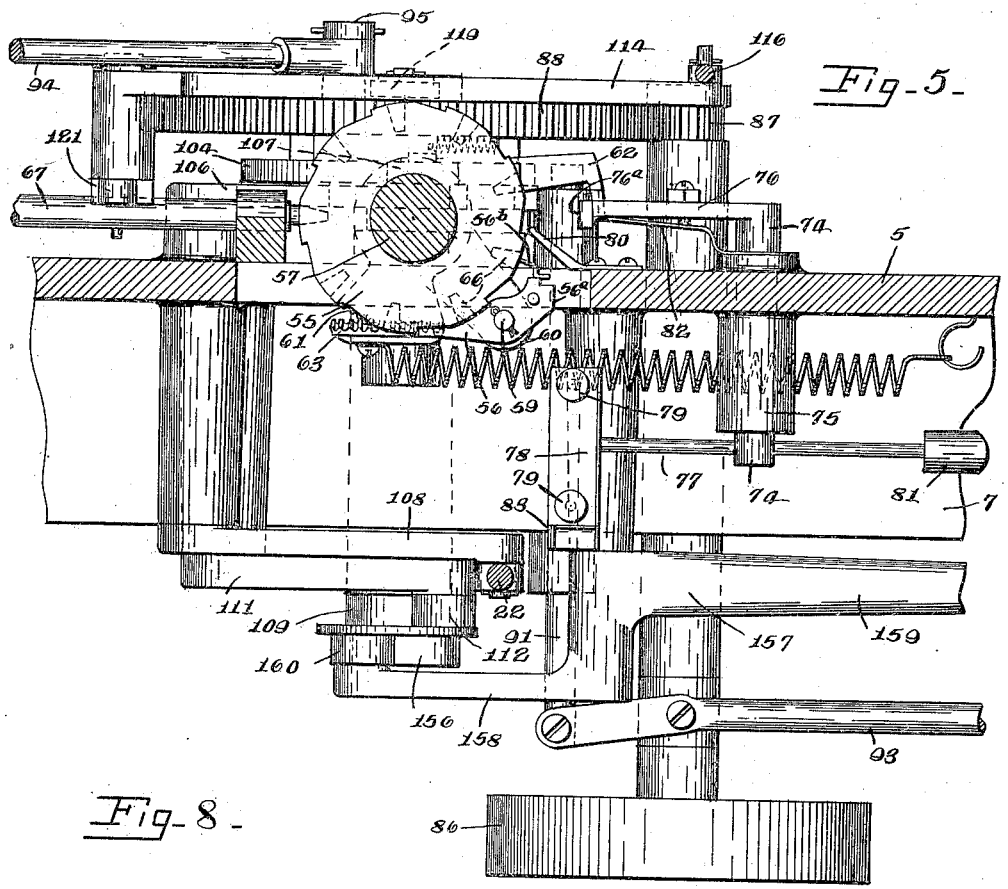
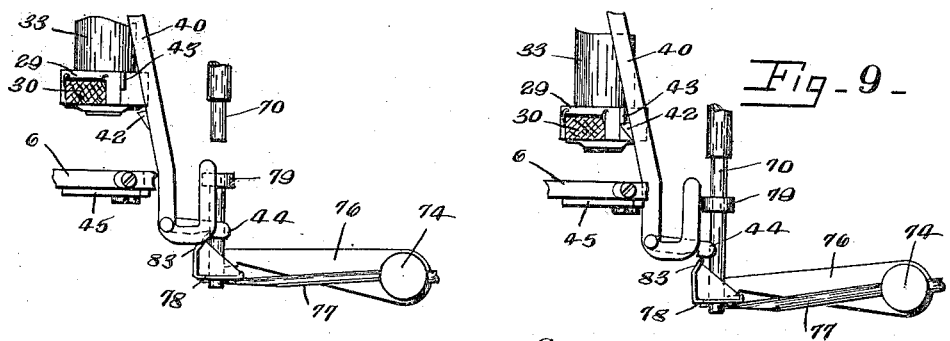
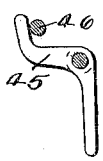

R. E. SMITH & F. E. CABLE.
MACHINE FOR MAKING CAPSULES.
APPLICATION FILED OCT. 19, 1912.

1,232,112.

Patented July 3, 1917.
8 SHEETS—SHEET 6.

WITNESSES:

INVENTORS
Rufus E. Smith
Frank E. Cable
BY
Parsons Hall Bodell
ATTORNEYS

R. E. SMITH & F. E. CABLE.
MACHINE FOR MAKING CAPSULES.
APPLICATION FILED OCT. 19, 1912.

1,232,112.

Patented July 3, 1917.
8 SHEETS—SHEET 7.

WITNESSES:
Chas. F. Young.
S. Davis.

INVENTORS
Rufus E. Smith
Frank E. Cable
BY
Parsons Hall Bodell
ATTORNEYS

R. E. SMITH & F. E. CABLE.
MACHINE FOR MAKING CAPSULES.
APPLICATION FILED OCT. 19, 1912.

1,232,112.

Patented July 3, 1917.
8 SHEETS—SHEET 8.

WITNESSES:

INVENTORS
ATTORNEYS

UNITED STATES PATENT OFFICE.

RUFUS E. SMITH AND FRANK E. CABLE, OF SYRACUSE, NEW YORK; SAID CABLE ASSIGNOR TO SAID SMITH.

MACHINE FOR MAKING CAPSULES.

1,232,112.        Specification of Letters Patent.        Patented July 3, 1917.

Application filed October 19, 1912. Serial No. 726,809.

*To all whom it may concern:*

Be it known that we, RUFUS E. SMITH and FRANK E. CABLE, of Syracuse, in the county of Onondaga and State of New York, have invented a certain new and useful Machine for Making Capsules, of which the following is a specification.

Our invention has for its object the production of a machine for making capsules or conceals which is particularly simple in construction and highly efficient and rapid in operation; and to these ends it consists in the combinations and constructions hereinafter set forth and claimed.

In describing this invention reference is had to the accompanying drawings in which like characters designate corresponding parts in all the views.

Fig. 4 is a sectional view of the powder receptacle and adjacent parts, taken at a right angle to the section of the receptacle in Fig. 3.

Fig. 5 is a horizontal sectional view on the plane of line "A—A", Fig. 3, parts being omitted.

Figs. 8 and 9 are detail views, partly broken away, of the lock for the moistener and the catch with which the lock coöperates, and also a portion of the governing means, the lock, catch and governing means being shown in different relative positions therein.

Fig. 9ª is a detail view of the returning lever for the latch shown in Figs. 8 and 9.

Figure 10:
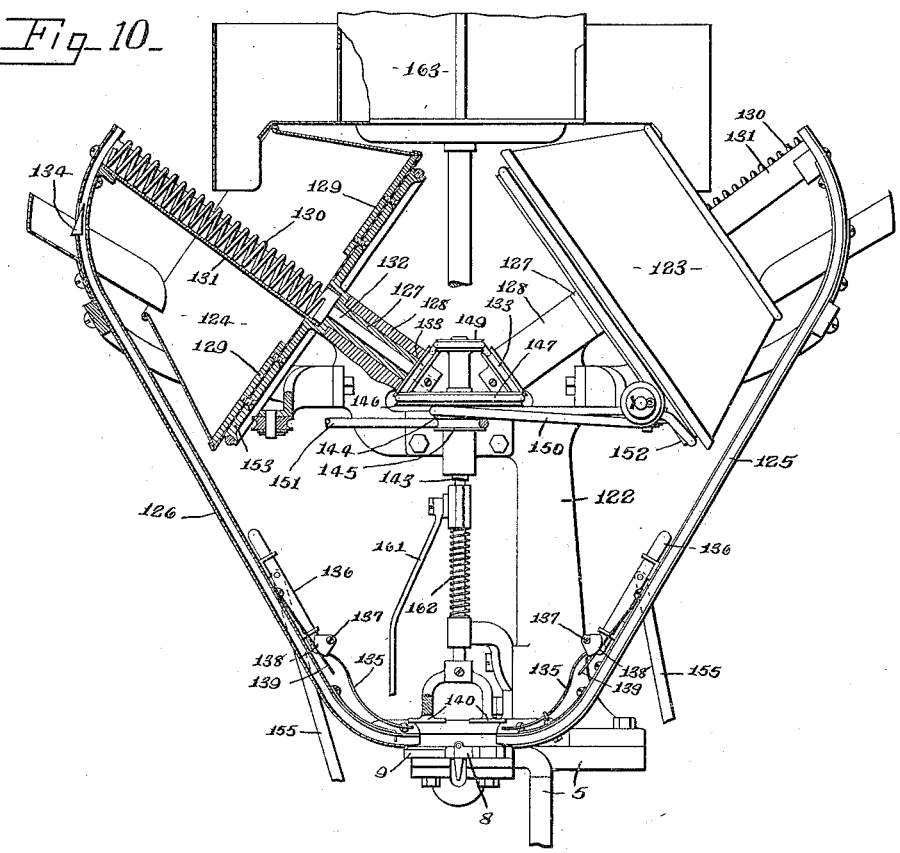

Fig. 10 is an elevation partly in section of the means for feeding capsule parts to the carrier.

Figure 11:
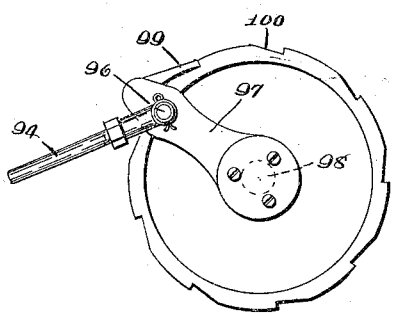

Fig. 11 is a detail of a portion of the connection between the actuating means and the carrier.

Figure 12:
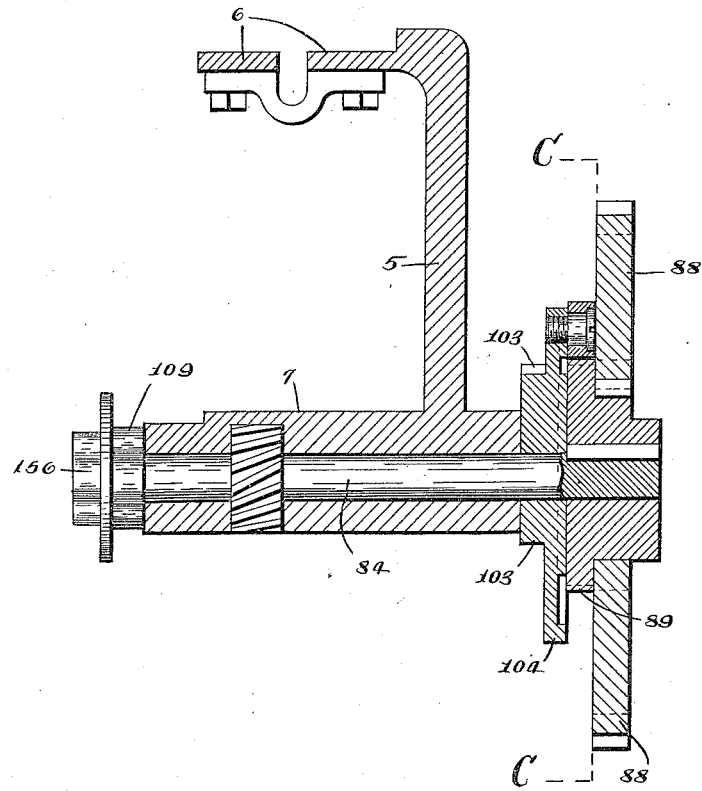

Fig. 12 is a sectional view extending longitudinally of the bearing for the main or cam shaft, showing said shaft and the parts thereon.

Figure 13:
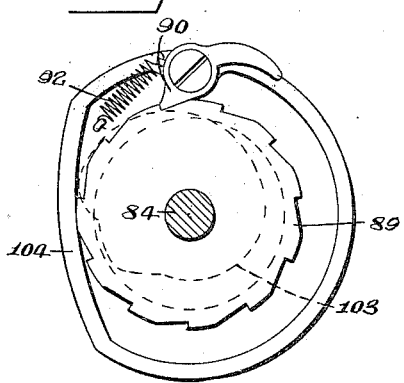

Fig. 13 is a sectional view on line "C—C", Fig. 12 showing one of the cams on the cam shaft and the main clutch.

This machine comprises a carrier for the capsule parts, mechanism for operating on capsule parts, as filling and sealing mechanism, actuating means for operating the filling and sealing mechanism, and means governed by the capsule parts about to be operated on for controlling the operation of said mechanism.

Figure 1:
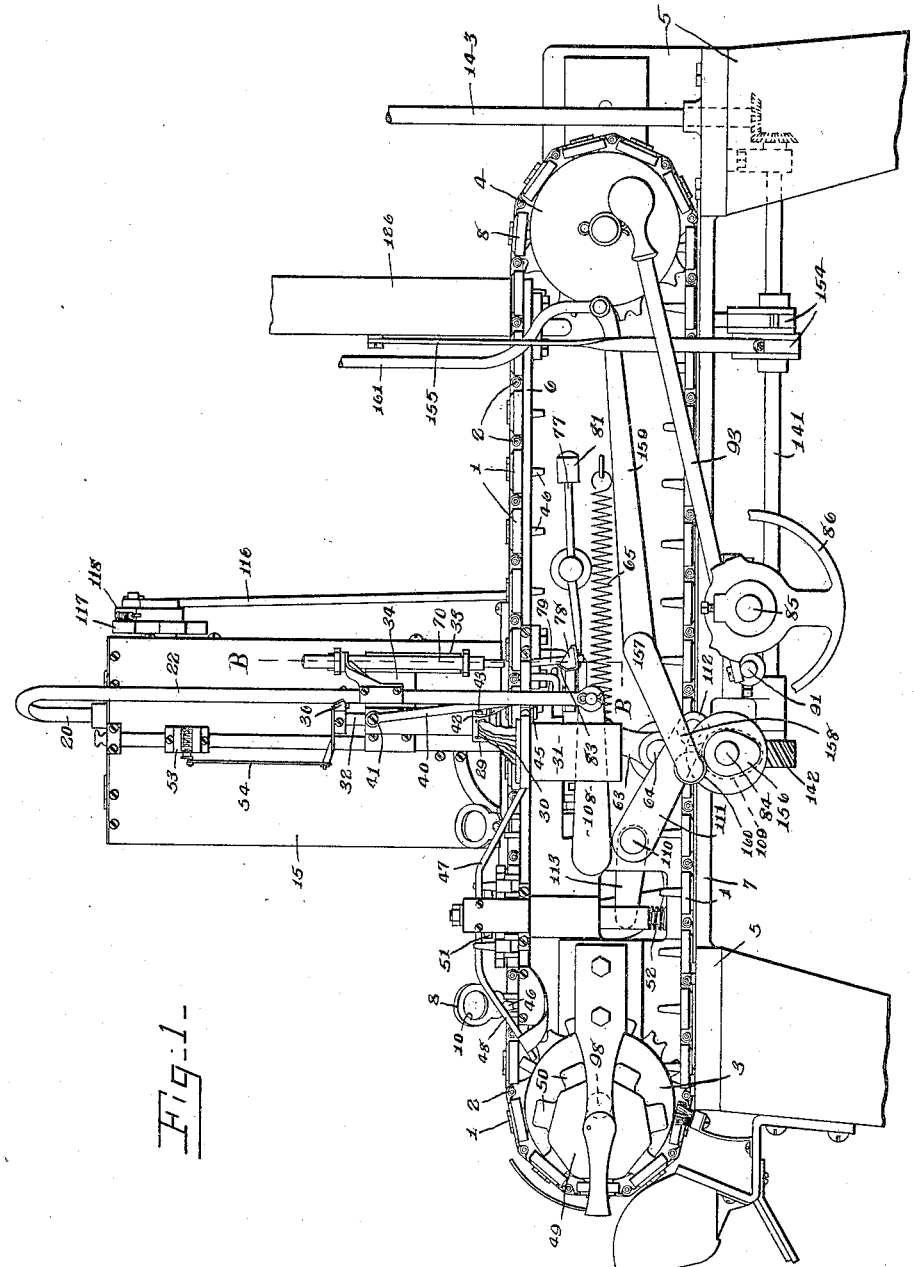
Figure 1 is a side elevation, partly broken away, of one embodiment of our machine.
Figure 2:
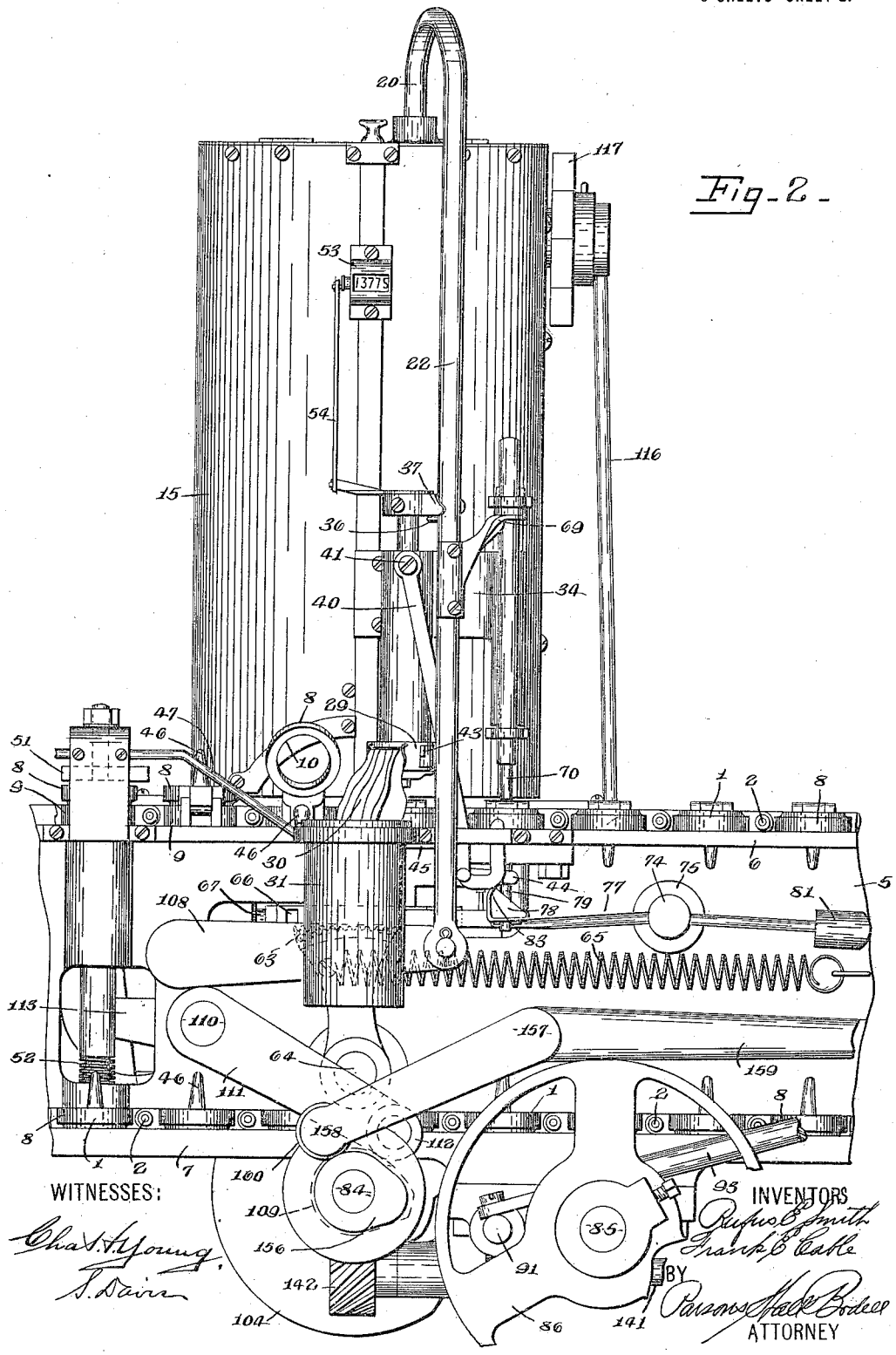
Figs. 2 and 3 are opposite elevations of the central part of the machine, the powder-receptacle being shown in section in Fig. 3.
Figure 6:
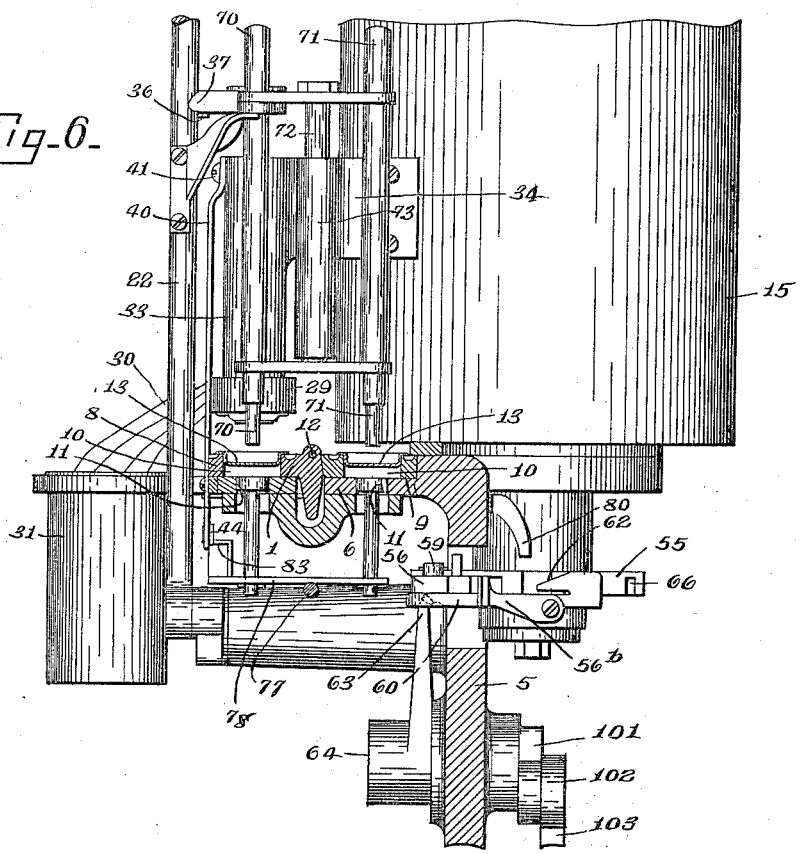
Figs. 6 and 7 are vertical sectional views, partly broken away and parts being removed, on the plane of line "B—B", Fig. 1, the governing members being shown in different positions.
Figure 7:
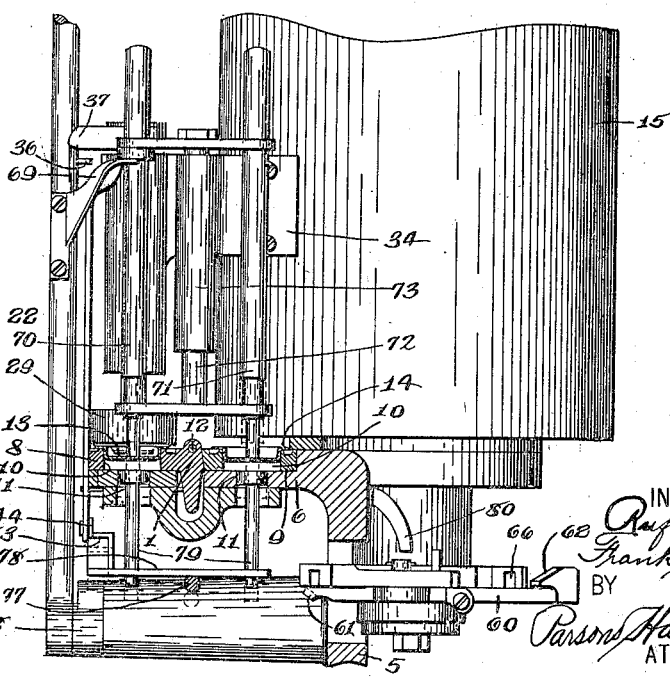

In the illustrated embodiment of our invention the carrier 1, Figs. 1, 2, 4, 6 and 7, comprises a plurality of individual means or holders hinged together at 2, in chain formation, the carrier running over pulleys or spiders 3 and 4, Fig. 1, at opposite ends of the frame 5, and being supported between the pulleys or spiders on upper and lower tables 6 and 7, Figs. 1 and 2. Each individual holder, as best seen in Figs. 6 and 7, is composed of two sections 8 and 9, respectively, for the parts of a capsule, each section having a socket or opening 10 for receiving one part of the capsule, and the sockets having open bottoms, which register with openings 11 in the upper table 6, when the holders are in their positions assumed preliminary to the filling and sealing of the capsule parts. One section of each holder is hinged at 12 to the other, Figs. 4, 6 and 7, and is foldable in a direction transversely of the direction of movement of the carrier, over onto the other section, Fig. 3, in order that the parts of the capsule will be sealed together. The carrier is connected to the actuating means to be intermittently advanced thereby, by connections hereinafter described.

The capsules, here shown, Figs. 4, 6 and 7, are composed of two cup-like parts 13, having flanges 14, which are sealed together and which, when the parts are in the sections 8, 9 rest on the edges of the sections 8, 9 surrounding the sockets 10. Capsules of this form are usually called conceals, and the parts thereof sometimes called disks or wafers.

The mechanism for operating on the capsule parts or disks on the carrier include principally filling mechanism and sealing mechanism.

The filling mechanism comprises a receptacle 15 supported by the frame, and means for controlling the feeding of the powder, or other matter to be contained in the capsules, from the receptacle into the capsule parts. The receptacle, as best seen in Fig. 4, is shown as overhanging a portion of the upper table 6, and having an outlet opening 13 in its bottom 17, the outlet opening being in the overhanging portion of the bottom so that one section 9 of each holder of the carrier 1 passes under the receptacle and its exit orifice.

The feed controlling means comprises an intermittently movable device as a plate 18, shown in this embodiment as rotatable in the receptacle 15, contiguous to the bottom 17 thereof, and having a circular series of pockets 19, which are carried consecutively into registration with the outlet opening 16 during the rotation of the plate 18, so that when a pocket is in registration with the outlet opening 16, the powder or other matter may pass into the capsule part beneath the outlet opening.

The powder feeds by gravity into the pockets 19 when they are not alined with the outlet opening 16, and is packed in the pockets against the bottom 17 of the receptacle 15 in order that each pocket will contain the same amount, as hereinafter described. As the powder is packed in the pockets it must be forced therefrom through the outlet 16, and preferably the powder is forced from each pocket 19 through the outlet opening 16 into the capsule part beneath said opening 16 by suitable means as a reciprocating, spring-pressed plunger 20, Fig. 4, movable in a tubular guide 21 within the receptacle. Said plunger extends above the top of the receptacle and is connected to a reciprocating element 22, which is connected to the actuating means to be operated during each operation of the machine. Said reciprocating element 22 operates to force the plunger upwardly against the action of a spring 23 located in said guide, and the spring returns the plunger and reciprocating element downwardly. Said element is connected to the actuating means to be intermittently actuated during the stoppings of the carrier 1. A shield 24, here shown as a flange fixed to the lower end of the guide 21 for the plunger and spaced apart from the plate 18, is provided for preventing the powder from sliding through the outlet 16 when a pocket 19 is alined with said outlet 16 and the plunger has not entered the pocket.

As the plate 18 is of a certain thickness and the pockets 19 are always filled, said plate is a device for measuring the amount of powder to be contained in each capsule or conceal.

Figure 3:
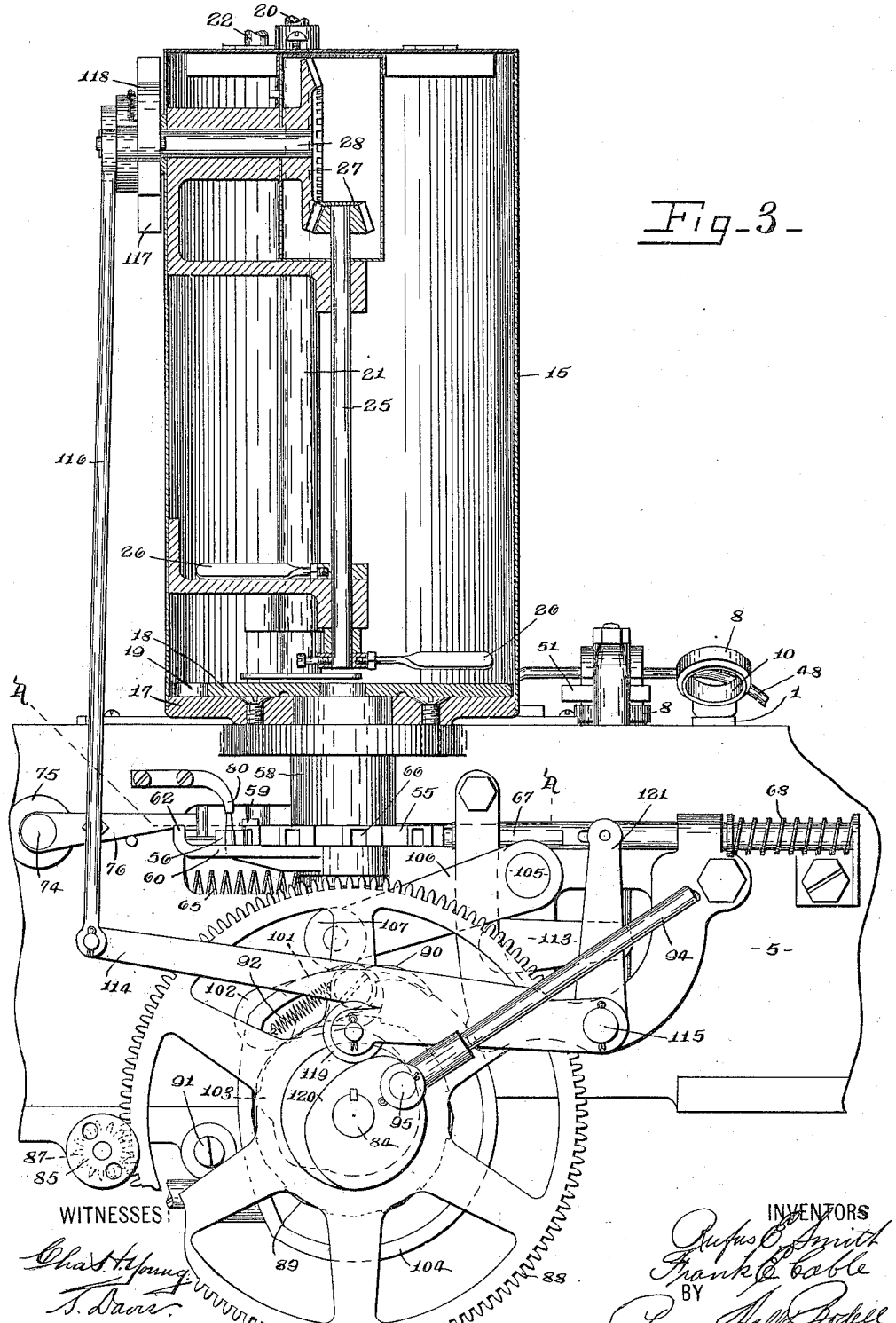

The rotatable plate 18 is intermittently movable synchronously with the operation of the carrier except when one or both disks or capsule parts are missing from the holder of the carrier, so that when the socket 10 of the left-hand section 9, Fig. 4, of a holder of the carrier 1 is alined with the outlet opening 16 and the carrier is at rest, a pocket 19 of said plate is alined with the outlet opening and said plate is at rest. Agitating means consisting of a vertical shaft 25 having blades 26 thereon, is arranged in the receptacle, said means including intermeshing bevel gears 27, Fig. 3, mounted, respectively, on the vertical shaft 25 and a horizontal shaft 28, the latter being extended transversely through one side of the receptacle and connected at its outer end, to the actuating means. One of the blades 26 is located just above the plate 18 and as said blade is inclined, it packs the powder in the pockets 19. The blades are adjustable to different inclines, and as seen in Fig. 3, are formed with threaded shanks which thread into hubs on the shaft 25.

As best seen in Figs. 1, 2, 4, 6 and 7, the sealing mechanism comprises a spring-pressed member as a moistener movable toward and from the carrier into engagement with the flange 14 of the right-hand capsule part, Fig. 4, about to be sealed, means for folding the foldable sections 8 of the holders constituting the carrier onto the other sections 9, and means for clamping the sections together after one section has been so folded over on the other. The moistener 29, as best seen in Fig. 4, comprises a reciprocally movable head having absorbent means as a wick 30 which receives and carries moisture from a cup 31, supported by the frame, and a stem 32 movable in a guide 33 in a block 34, here shown as fixed to the receptacle 15. A spring 35, Fig. 4, arranged in the guide 33 and interposed between the block 34 and the head of the moistener, tends to force the moistener into operative position; and a laterally-extending arm 36, provided on the stem 32, engages the upper side of a pin 37 extending laterally from the reciprocating element 22, and acts to return the moistener 29 to its starting position, and to control the movement of the moistener by its spring. Obviously, as the reciprocating element 22 moves downwardly the moistener 29 will normally move therewith. The moistener 29 is also provided with a yielding pusher 38 normally extending beyond the advance face of the head and being preferably pressed outwardly by a spring 39, this pusher operating to engage the capsule part in advance of the head and press the same firmly into the socket of the section 8 of the carrier 1 and to yield as the head approaches the capsule part, and to remain in contact with the capsule part and prevent said part from adhering to the head as the head recedes from the capsule part.

Means is provided for holding the moistener 29 from movement with its actuating element 22 when no capsule part or disk is in position to be moistened. Said mechanism comprises a lock 40, Figs. 1, 2, 4, 8 and 9, pivoted at 41 to the block 34, and provided with a shoulder 42, which engages a lug 43 on the moistener 29, and with a latch 44, Figs. 8 and 9, pivoted thereto and normally engaging a catch associated with the means operated by the means governed by the capsule parts about to be filled and sealed, for controlling the operation of the powder feeding means and the moistener. The lock 40 depends from its pivot 41 and is normally held out of a vertical plane and swings when released into a vertical plane into engagement with the moistener. The latch 44 normally holds the lock out of operative position, so that the shoulder 42 is out of the path of the lug 43, and the latch is released from the catch, as presently described, to permit the shoulder and lug to engage, when one or both sections 8, 9 of the holder about to be moved to the filling and sealing mechanisms, is or are empty. When the latch 44 is engaged with said catch, the lock is inclined out of the vertical plane of said pivot and therefore will move by gravity into the position it assumes when the shoulder 42 encounters the lug 43. Said lock is returned to its normal position by a lever 45, Figs. 4, 8 and 9ª, pivoted intermediate of its ends to the underside of the table 6. One end of said lever is arranged in the path of depending shoulders 46 associated with the foldable sections 8 of the holders of the carrier 1, and its other end swings in the path of the lock 40. The lever is so arranged relatively to the stopping point of the shoulder 46 coöperating therewith, that the shoulder is disengaged from the lever at the end of the intermittent advance of the carrier, thus leaving the lock free to move on its pivot 41 if the latch 44 is not engaged with its catch.

As seen in Figs. 1 and 2, the means for folding one of the sections 8 of each holder over onto the other section 9 comprises a cam 47 fixed to the frame and operating to elevate the foldable section 8 so that it will fall by gravity over onto the other section, when inclined to an angle greater than a right angle. The sections are unfolded to permit the removal of the complete capsule from one or the other of the sections by a similar cam 48 fixed to the frame, and arranged oppositely to that of the first-mentioned cam. As here shown, the shoulder 46 of each of the foldable sections 8 slidably engages said cams 47, 48. The completed capsules are removed from the carrier by a rotatable member 49, Fig. 1, having peripheral projections 50 which enter the sockets 10 and eject the capsules.

The means for clamping the sections 8, 9 together comprises a pressure-foot 51 extending vertically relatively to the frame and overhanging the carrier 1 and table 6. Said pressure foot is reciprocally movable, and is moved in one direction by the actuating means as hereinafter described and in the opposite direction by a spring 52, Fig. 2. A counter 53, Fig. 2 secured to the side of the receptacle 15 is actuated by the moistener, said counter and said moistener being connected by a link 54.

The means governed by the capsule parts about to be filled and sealed, for controlling the operation of the filling mechanism and the sealing mechanism, comprises clutch members connected, respectively, to the feeding means and to the actuating means, one clutch member being normally in operative position and shiftable relatively to the other out of operative position, a support movable during each operation of the machine toward and from the sections 8, 9 which normally contain the capsule parts or disks about to be filled and sealed, and governing members carried by the support and movable thereby through the spaces normally occupied by the capsule parts or disks when about to be filled and sealed into connection with the shiftable clutch member, for moving said member from operative position, and the governing member being adapted to be prevented from partaking of the full movement of the support by the capsule parts or disks about to be filled and sealed.

The clutch members are in this form of our machine respectively, a ratchet wheel 55, Figs. 5, 6 and 7, and a pawl 56 for coöperating with the ratchet wheel, the ratchet wheel being here shown mounted on a stud 57 fixed to the plate 18 and depending through the bottom 17 of the receptacle 15, and journaled in a vertical bearing 58 in the frame; and the pawl 56 being pivoted at 59 to an oscillating support or arm 60 loosely mounted on the stud 57, the support having a rack 61 and also a cam 62 in rear of, and spaced apart from, the pawl. Said support 60 is actuated in one direction by a sector 63, Fig. 4, meshing with the rack 61 and mounted on a rock shaft 64 journaled in a transverse bearing in the frame. The rock shaft is actuated in one direction by a spring 65 having one end connected to the frame and its other end to the sector. The ratchet wheel 55 is also formed with sockets 66, into one of which a sliding bolt 67 enters at the end of each advance of the ratchet wheel and plate 18, for holding the plate 18 from movement when a pocket 19 in said plate 18 is alined with the outlet opening 16, said bolt being moved into operative position by a spring 68 Fig. 3 which is tensioned by the driving means as hereinafter described.

As seen in Figs. 1, 2, 6 and 7, the support 69 for the governing members 70 and 71 is carried by the reciprocating element 22, from which the plunger 20 and the moistener 29 receive their movement, said support having a rod 72 movable in a guide 73 formed in the block 34. The governing members are movably carried by the support and are usually slidably carried in guides formed therein. The movement of the support 69 is transmitted through one or both of the governing members to the pawl 56 by a shifter of suitable construction and here illustrated, Fig. 5, as including a rock shaft 74 journaled in a transverse bearing 75, and carrying an arm 76 at one end, Figs. 3 and 5, which coöperates with the pawl 56, and an arm 77, Figs. 1, 2 and 5, at its opposite end which coöperates with the governing members. Said arm 77 is provided at its end with a cross strip or spoon 78 arranged beneath the holder containing the capsule parts or disks about to be filled and sealed, and is secured to the lower ends of a pair of power-transmitting parts as plungers 79, Figs. 5, 6 and 7, movable in the openings 11, in the table 6. The upper ends of the said parts or plungers 79 are arranged in the path of the governing members 70 and 71, so that when either or both of the governing members are not held by a capsule part or parts from partaking of the full movement of the support 69, said governing members will engage the plungers and by their weight will depress said plungers and said arm 77 of the rock shaft 74, and thereby throw the shifter arm 76 in position to move the pawl 56 out of engagement with the ratchet wheel 55. The shifter, when in operative position is also in the path of the cam 62, Figs. 5, 6 and 7, located in the rear of the pawl 56 in order that the shifter will be returned to its normal or inoperative position at the end of each forward movement of the pawl support 60. The shifting of the pawl 56 by the arm 76 is effected as follows: The pawl 56 is provided with a face 56ª on its tail and during the movement of the pawl 56 rearwardly in an arc, the face 56ª strikes the face 76ª on the end of the shifter arm 76.

The pawl 56 is returned to its operative position during the retrograde movement of the pawl support by a cam fixed to the frame, or knock-off device 80, Figs. 3 and 5, and is impositively held from returning by a spring catch 56ᵇ, Fig. 5. The rock shaft 74 is provided with a weighted arm 81, Figs. 1, 2 and 5, for counterbalancing the shifter arm 77, and is also provided with a friction means 82, Fig. 5, for holding it in any of the positions to which it is moved. Said arm 77 also supports a catch 83 for coöperating with the latch 44 of the lock 40 for the moistener. When both of the governing members 70, 71 are intercepted in their movement, by the capsule parts or disks about to be filled and sealed, the latch 44 will remain engaged with the catch 83 thus holding the lock out of its operative position and permitting the movement of the moistener 29.

As best seen in Figs. 1, 2, 3, 5, 12 and 13, the actuating means consists of a cam shaft 84 extending transversely of the frame and driven by means of a shaft 85 journaled in the frame and provided with a driving pulley 86, and with a gear wheel 87 which meshes with a gear wheel 88, Fig. 3, mounted on the cam shaft 84. The gear wheel 88 is loosely mounted on the cam shaft and may be connected thereto by suitable clutch mechanism, here shown as a ratchet wheel 89 associated with the cam shaft and a pawl 90 associated with the gear wheel 88 as shown in dotted lines, Fig. 3, and a shifter 91 for moving the pawl into engagement with the ratchet wheel against the action of a spring 92 which tends to hold the pawl out of engagement with the ratchet wheel. The shifter 91 consists of a sliding wedge, Fig. 5, one end of which moves into and out of engagement with the tail of said pawl; and the other end of which is pivoted to a hand lever 93. Said cam shaft 84 is connected to the carrier 1 by a link 94, Fig. 3, having one end connected to a wrist-pin 95 on the cam shaft, and its other end pivoted at 96, Fig. 11, to a rock arm 97 mounted on the shaft 98 upon which the pulley 3 is mounted, and carrying a pawl 99, which coöperates with the ratchet wheel 100, also carried by said shaft 98. The pivot 96 connecting the link 94, and rock arm 97 is of greater eccentricity than that of the wrist pin 95, so that an oscillating movement is imparted to the pawl 99. The rock shaft 64 upon which the sector 63 is mounted, is also provided with an arm 101, Figs. 3 and 4, carrying a roller 102 which engages a cam 103 on the cam shaft.

The reciprocating element 22 is initially actuated by a cam 104, Figs. 3 and 12, on the cam shaft and a rock shaft 105 journaled in the frame and having rock arms at its opposite ends, one rock arm 106 having a roller 107 which engages the cam 104 on the cam shaft, the other arm 108 being pivoted to the reciprocating element 22. The pressure foot 51 of the sealing means is similarly actuated by a cam 109 on the cam shaft, a rock shaft 110 extending transversely of the frame and having rock arms at its opposite ends, one rock arm 111 having a roller 112 which rides on said cam, and the other arm 113 bearing on a shoulder provided on the pressure foot and acting to depress the pressure foot against the action of its spring 52.

The agitator shaft 25 within the receptacle 15, is actuated by means of an arm 114 pivoted at one end at 115 to the frame and at its other end to a link 116, which is connected to the shaft 28 by means of a ratchet wheel 117 and pawl 118, said arm 114 having a roller 119 arranged intermediate of its ends which rides upon a cam 120 on the cam shaft. Said cam 120 also actuates the reciprocating bolt 67 in one direction, through the medium of an angular extension 121 of said arm, and tensions the spring 68 for actuating the bolt in the opposite direction.

This machine is preferably provided with means for automatically placing the capsule parts or disks in the individual holders of the carrier, said means being of substantially the same construction as that shown in Patent No. 953,353, March 29, 1910. This means comprises, generally, a frame 122, Figs. 1 and 10, suitably supported upon the main frame 5 of the machine, receptacles 123 and 124 for the capsule parts or disks, chutes 125 and 126 for conveying said parts or disks to the sections 8 and 9, respectively, of the holders of the carrier, and means for conveying the capsule parts or disks from the receptacles to the chutes.

The receptacles are here shown as rotatable about inclined axes and provided with hubs 127 journaled in bearings 128 formed in the frame 122, and also with radial ribs 129 on their bottoms for raising the capsule parts or disks and feeding them into the means for conveying said parts to the chutes. Each of the last-mentioned means comprises a rotatable spiral 130 arranged in a trough 131, the end of the trough communicating with a chute 125 or 126. Each spiral is carried by a spindle 132 extending axially of the hub 127 of the corresponding receptacle and having a pulley 133 at its end. A switch 134 is located in each chute for deflecting, out of the chute, capsule parts or disks, not arranged in a predetermined position.

The lower ends of the chutes terminate close to the carrier 1, and mechanism for discharging the capsule parts or disks from each chute into the carrier, is provided of slightly different construction from that of said Patent No. 953,353. The mechanism for each chute consists of a finger 135 supported by a reciprocating carriage 136 slidable on the chute, the finger engaging and placing the lowermost capsule part or disk in the chute, into the socket 10 of the section 8 or 9 of the holder opposite the end of the chute. As here shown each of the fingers 135 is suitably carried upon a rock shaft 137 upon the carriage 136, the rock shaft having a sector 138, which frictionally engages a flat spring 139 fixed at one end to the chute, its free end engaging the sector. As the carriage moves downwardly, the sector will be partly turned, by reason of its contact with the spring, in a direction to force the finger 135 upon the lowermost capsule part in the corresponding chute. When the carriage moves rearwardly, the finger will be moved in the opposite direction out of engagement with the capsule part of the chute. A pressure foot 140, is also provided, as in said patent referred to, for pressing the capsule parts in the sockets of the holders.

The movable parts of the mechanism for placing the capsule parts or disks in the sections 8, 9 of the carrier 1, are actuated by the cam shaft 84, motion being transmitted from the cam shaft to all of said parts, except the pressure foot, by a shaft 141, running lengthwise of the frame 5 and connected to the cam shaft 84 by a worm 142, the receptacles 123 and 124, and the spirals 130 being actuated from a vertical shaft 143 geared to the former shaft and carrying three pulleys 144, 145 and 146, one above the other. The upper pulley 146 is connected to the spirals 130 by a belt 147 passing around said pulley and around the two pulleys 133, associated, respectively, with the spirals and around an idler 149 carried at the upper end of said shaft 143. The pulleys 144 and 145 are connected, respectively, to the receptacles 123 and 124 by belts 150 and 151 passing around said pulleys 144 and 145 and around pulleys 152 and 153 fixed to the bottoms of the receptacles, respectively. The finger carriages 136 are reciprocated by means of eccentrics 154 on the shaft 141 and links 155 connecting the eccentrics to said carriages. The pressure foot 140 is actuated in one direction by a cam 156 on the cam shaft 84 and a rock shaft 157 having arms 158 and 159, one of which carries a roller 160 engaging the cam 157 on the cam shaft and the other being connected to the end of a link 161 which link is connected to the pressure foot. The pressure foot is actuated in the opposite direction by a spring 162.

Capsule parts are supplied to the receptacles 123, 124 by a hopper 163 supported above the receptacles.

The various cams are arranged and timed to intermittently move the carrier 1 and the feeding plate 18 together except when no capsule parts are in the sections 8, 9 in position to support parts about to be filled and sealed, and the reciprocating element 22 actuated during the stoppings of the carrier 1 and plate 18, hence carrying the governing members and moistener 19 into and out of operative position; and in operation the capsule parts or wafers are automatically placed in the carrier 1 in proper position to be filled and sealed, are conveyed to the filling and sealing mechanisms, and the finished product is finally expelled from the machine without any attention from the operator; and there is no waste, as the powder or other matter will not feed from the receptacle unless there are two capsule parts in the holder about to be presented to the filling and sealing mechanism.

What we claim is:

1. In a machine of the class described, a movable carrier for parts to be filled, filling mechanism arranged in position to fill parts on the carrier, actuating means for the carrier and said mechanism, and means governed by the parts on the carrier in position to be filled for disconnecting the filling mechanism from actuating means when no part is in position to be filled, substantially as and for the purpose described.

2. In a machine of the class described, a movable carrier for supporting parts to be filled, filling mechanism arranged to fill parts on the carrier, the carrier having means for carrying the parts in pairs and to carry one of the parts of each pair to the filling mechanism, actuating means for the carrier and the filling mechanism, governing means including members coacting with the parts of each pair on the carrier in position to be filled, and means operated by the governing means for disconnecting the filling mechanism from the actuating means when one of said parts is missing, substantially as and for the purpose specified.

3. In a machine of the class described, a movable carrier for supporting parts to be filled, filling mechanism arranged to fill parts on the carrier, the carrier having means for carrying the parts in pairs and to carry one of the parts of each pair to the filling mechanism, actuating means for the carrier and the filling mechanism, power transmitting means between the filling mechanism and the actuating means, and governing means including members coacting with the parts of each pair on the carrier in position to be filled, and means operated by the governing means and coacting with the power transmitting means to disconnect the power transmitting means from the actuating means when one of said parts is missing, substantially as and for the purpose set forth.

4. In a machine of the class described, an intermittently movable carrier for capsule parts, intermittently actuated mechanism operable on capsule parts on the carrier during the intermittent stoppings thereof, said mechanism being intermittently actuated, actuating means for the carrier and said mechanism, and means governed by the capsule parts on the carrier in position to be operated on for connecting and disconnecting said mechanism, and the actuating means, substantially as and for the purpose described.

5. In a machine of the class described, an intermittently actuated carrier for capsule parts, an intermittently actuated element movable during the stoppings of the carrier, intermittently actuated mechanism operable on predetermined capsule parts on the carrier, actuating means connected to the carrier and to said element to actuate the same during each operation of the machine and connected also to said mechanism, and means operated by said element and governed by the capsule parts about to be acted on by said mechanism for connecting and disconnecting said mechanism, and the actuating means, substantially as and for the purpose specified.

6. In a machine of the class described, an intermittently actuated carrier for the capsule parts, an intermittently actuated element movable during the stoppings of the carrier, mechanism operable on the capsule parts to complete the capsule, actuating means connected to the carrier and to said element to actuate the same during each actuation of the machine, power-transmitting means between the actuating means and said mechanism including clutch members, one being shiftable into and out of engagement with the other and being normally engaged therewith, and means actuated by said element and governed by the capsule parts about to be acted on by said mechanism for controlling the shifting of the shiftable clutch member out of engagement with the other clutch member, substantially as and for the purpose set forth.

7. In a machine of the class described, an intermittently actuated carrier for the capsule parts, an intermittently actuated element movable during the stoppings of the carrier, intermittently actuated mechanism operable on the capsule parts to complete the capsule, actuating means connected to the carrier and to said element to actuate the same during each actuation of the machine, power-transmitting means between the actuating means and said mechanism including clutch members, one being shiftable into and out of engagement with the other and being normally engaged therewith, means actuated by said element and governed by the capsule parts about to be operated on by said mechanism for controlling the movement of the shiftable clutch member out of engagement with the other clutch member, and means for effecting the return of the shiftable clutch member from its operative position for the next operation of the machine, substantially as and for the purpose described.

8. In a machine of the class described, an intermittently movable carrier for capsule parts, mechanism operable on parts on the carrier during the intermittent stoppings thereof, said mechanism being intermittently actuated when the carrier is at rest, actuating means for the carrier and said mechanism, and means governed by the capsule parts on the carrier in position to be operated on for controlling the operation of said mechanism by the actuating means, the controlling means including governing members arranged to normally engage and be held from movement by the capsule part or parts about to be operated on by said mechanism and to pass through the empty space or spaces of the carrier in position to hold the capsule part or parts in position to be operated on, substantially as and for the purpose specified.

9. In a machine of the class described, an intermittently actuated carrier for the capsule parts, an intermittently actuated element movable during the stoppings of the carrier, independently operable mechanism coacting with the capsule parts to complete the capsule, actuating means connected to the carrier and to said element to actuate the same during each operation of the machine, power-transmitting means between the actuating means and said mechanism including clutch members, one being shiftable into and out of engagement with the other and being normally engaged therewith, a shifter for moving the shiftable clutch member out of operative position, governing members carried by said element to move therewith and to move relatively thereto, the governing members and the shifter extending on opposite sides of the carrier; and said members being movable into engagement with capsule parts on the carrier in position to be operated on and to pass through the empty space or spaces of the carrier when no capsule parts are in position to be operated on, and into coöperation with the shifter to operate the same, substantially as and for the purpose set forth.

10. In a machine of the class described, means for holding capsule parts, filling mechanism for the matter to be contained in the capsule actuating means, power transmitting means between the actuating means and the filling mechanism, and means governed by the capsule part about to be filled for controlling the connecting and disconnecting of the filling mechanism and the actuating means, substantially as and for the purpose described.

11. In a machine of the class described, means for holding capsule parts, filling mechanism for the matter to be contained in the capsule, said mechanism including a movable part, constantly moving means for actuating said part, and means governed by the capsule part about to be filled for connecting and disconnecting said part and said constantly moving means, substantially as and for the purpose specified.

12. In a machine of the class described, means for holding capsule parts, filling mechanism for the matter to be contained in the capsule, said mechanism including a movable part, and means governed by the capsule part about to be filled for controlling the operation of said movable part, the controlling means including a governing member arranged to normally engage, and be held from further movement by, the capsule part about to be filled and to pass through the empty space of the holding means in position to hold a capsule part in position to be filled and to pass into connection with the controlling means when no capsule part is in position to be filled, substantially as and for the purpose set forth.

13. In a machine of the class described, means for holding capsule parts, filling mechanism for the matter to be contained in the capsule, said mechanism including a movable part, actuating means, clutch members connected respectively to the actuating means, one clutch member having movement into and out of engagement with the other, and means governed by the capsule part about to be filled for controlling the engagement of the clutch members, substantially as and for the purpose described.

14. In a machine of the class described, means for holding capsule parts, filling mechanism for the matter to be contained in the capsule, said mechanism including a movable part, actuating means, clutch members connected respectively to the movable part of the filling mechanism and to the actuating means, one clutch member being shiftable into and out of engagement with the other, and means for controlling the movement of the shiftable clutch member including a governing member connected to the actuating means to be moved thereby and arranged to normally engage the capsule part about to be filled and to pass through the empty space of the holding means in position to support a part in position to be filled, substantially as and for the purpose specified.

15. In a machine of the class described, means for holding capsule parts, filling mechanism for the matter to be contained in the capsule, said mechanism including a movable part, actuating means connected to said movable part of the filling mechanism, and means governed by the capsule part about to be filled for controlling the operation of said movable part, the controlling means including a support connected to the actuating means to be moved thereby toward and from the holding means, and a governing member carried by the support and movable relatively thereto and being arranged to move with the support into connection with the feeding means when no capsule part is in position about to be filled, and into connection with the capsule part in position about to be filled and held thereby from full movement with the support, substantially as and for the purpose set forth.

16. In a machine of the class described, means for holding capsule parts, filling mechanism comprising a receptacle for the matter to be contained in the capsule, said mechanism including a movable part, actuating means, clutch members connected respectively to the movable part of the filling means and to the actuating means, one clutch member being shiftable into and out of engagement with the other, and means for controlling the shiftable clutch member including a reciprocating support connected to the actuating means to be moved thereby toward and from the holding means during each operation of the machine, and a governing member carried by the support and movable relatively thereto and arranged to be moved by the support through the empty space of the holding means in position to support a capsule part when about to be filled, and into coöperation with the shiftable clutch member, and arranged to engage the capsule part in position about to be filled and prevented thereby from operating the shiftable clutch member, substantially as and for the purpose described.

17. In a machine of the class described, means for holding capsule parts, filling mechanism for the matter to be contained in the capsule, said mechanism including a movable part, actuating means, clutch members connected respectively to said movable part of the filling mechanism and to the actuating means, one clutch member being shiftable into and out of engagement with the other, and means for controlling the shiftable clutch member including a shifter coacting with the shiftable clutch member to move the same out of operative position, and a governing member connected to the actuating means to be moved thereby and arranged to be moved into coöperation with the shifter through the empty space of the holding means in position to hold a capsule part to be filled, and prevented from such movement by the capsule part when in position about to be filled, substantially as and for the purpose specified.

18. In a machine of the class described, means for holding capsule parts, filling mechanism for the matter to be contained in the capsule, said mechanism including a movable part, actuating means, clutch members connected respectively to said movable part and to the actuating means, one clutch member being shiftable into and out of engagement with the other and normally engaged therewith, a shifter for moving the shiftable clutch member out of operative position, and means for controlling the movement of the shifter including a governing member, the governing member and the shifter being arranged on opposite sides of the holding means, and the governing member being connected to the actuating means to be moved thereby through the empty space of the holding means in position to hold a capsule part in position to be filled and into coöperation with the shifter, to operate the same, and the governing means being arranged to be prevented from such movement by the capsule part in position about to be filled, substantially as and for the purpose set forth.

19. In a machine of the class described, means for holding capsule parts, filling mechanism for the matter to be contained in the capsule, said mechanism including a movable part, actuating means, clutch members connected respectively to the movable part of the filling mechanism and to the actuating means, one clutch member being shiftable into and out of engagement with the other and being normally in engagement therewith, means governed by the capsule parts about to be filled for controlling the operation of the shiftable clutch member out of operative position, and means for returning the clutch member into its operative position for the next operation of the machine after the same has been moved out of operative position by the controlling means, substantially as and for the purpose described.

20. In a machine of the class described, means for holding capsule parts, filling mechanism for the matter to be contained in the capsule, said mechanism including an intermittently actuated part, actuating means, a clutch member associated with said intermittently actuated part, and a second clutch member coacting with the former clutch member, an oscillating support for the second clutch member, the support being connected to the actuating means, and the second clutch member being normally engaged with the first mentioned clutch member and means for shifting the second clutch member out of engagement with the former clutch member during a single operation of the machine, substantially as and for the purpose specified.

21. In a machine of the class described, means for holding capsule parts, filling mechanism for the matter to be contained in the capsule, said mechanism including an intermittently actuated part, actuating means, clutch members including a ratchet wheel associated with said intermittently actuated part, and a pawl coacting with the ratchet wheel, an oscillating support for the pawl, the support being connected to the actuating means, and the pawl being normally engaged with the ratchet wheel, means for shifting the pawl out of engagement with the ratchet wheel during a single operation of the machine, and means for shifting the pawl into engagement with the ratchet wheel for the next operation, substantially as and for the purpose set forth.

22. In a machine of the class described, means for holding capsule parts, filling mechanism for the matter to be contained in the capsule, said mechanism including an intermittently actuated part, actuating means, clutch members including a ratchet wheel associated with said intermittently actuated part, and a pawl coacting with the ratchet wheel, an oscillating support for the pawl, the support being connected to the actuating means, the pawl being normally engaged with the ratchet wheel, and means for controlling the movement of the pawl including a governing member connected to the actuating means to be moved thereby and arranged to normally engage the capsule part about to be filled and to pass through the empty space of the holding means in its position occupied when containing a capsule part about to be filled, and to pass into coöperation with the pawl to shift the same out of operative position, substantially as and for the purpose described.

23. In a machine of the class described, means for holding capsule parts, filling mechanism for the matter to be contained in the capsule, said mechanism including an intermittently actuated part, actuating means, clutch members including a ratchet wheel associated with said intermittently actuated part, and a pawl coacting with the ratchet wheel, an oscillating support for the pawl, the support being connected to the actuating means, and the pawl being normally engaged with the ratchet wheel, means for moving the pawl out of engagement with the ratchet wheel, and means carried by the oscillating part for resetting the last-mentioned means in its normal position, substantially as and for the purpose specified.

24. In a machine of the class described, means for holding capsule parts, filling mechanism for the matter to be contained in the capsule, said mechanism including an intermittently actuated part, actuating means, clutch members including a ratchet wheel associated with said intermittently actuated part, and a pawl coacting with the ratchet wheel, an oscillating support for the pawl, the support being connected to the actuating means, the pawl being normally engaged with the ratchet wheel, a shifter for moving the pawl out of engagement with the ratchet wheel, the shifter being normally out of operative position, means for controlling the movement of the shifter including a yielding member connected to the actuating means to be moved thereby, and arranged to coact with the shifter to operate the same and to normally yieldingly engage the capsule part about to be filled and thereby be prevented from operating the shifter, substantially as and for the purpose set forth.

25. In a machine of the class described, means for holding capsule parts, filling mechanism for the matter to be contained in the capsule, said mechanism including an intermittently actuated part, actuating means, clutch members including a ratchet wheel associated with said intermittently actuated part, a pawl coacting with the ratchet wheel, an oscillating support for the pawl, the support being connected to the actuating means, the pawl being normally engaged with the ratchet wheel, a shifter for moving the pawl out of engagement with the ratchet wheel, the shifter being normally out of operative position, means for controlling the movement of the pawl including a yielding member connected to the actuating means to be moved thereby, and arranged to operate the shifter and to normally yieldingly engage the capsule part about to be filled, and be prevented thereby from operating the shifter, and means carried by the oscillating part for returning the shifter to its normal position after being operated by the governing member, substantially as and for the purpose described.

26. In a machine of the class described, means for holding capsule parts, filling mechanism for the matter to be contained in the capsule, said mechanism including an intermittently actuated part, actuating means, clutch members including a ratchet wheel associated with the intermittently actuated part, and a pawl coacting with the ratchet wheel, an oscillating support for the pawl, the support being connected to the actuating means, the pawl being normally engaged with the ratchet wheel, a shifter for moving the pawl out of engagement with the ratchet wheel, and means for controlling the movement of the pawl out of operative position including a reciprocating element movable during each operation of the machine and connected to the actuating means, a governing member carried by said element and movable relatively thereto, the governing member and the shifter extending on opposite sides of the holding means, the governing member being arranged to engage the capsule part about to be filled, and to move through the empty space of the holding means when no capsule part is in position about to be filled, and into engagement with the shifter to actuate the same, substantially as and for the purpose specified.

27. In a machine of the class described, means for holding the capsule parts, and filling mechanism including a receptacle for the matter to be contained in the capsule, the receptacle being formed with an outlet opening, and a reciprocating plunger for forcing the material through such opening and into the capsule parts, substantially as and for the purpose set forth.

28. In a machine of the class described, means for holding the capsule parts, filling mechanism comprising a receptacle having an outlet opening, and a measuring device including a plate formed with a pocket movable into and out of registration with said opening, and means for forcing the matter in the pocket through the outlet opening when said pocket and outlet opening are in alinement, substantially as and for the purpose described.

29. In a machine of the class described, means for holding the capsule parts, filling mechanism comprising a receptacle having an outlet opening, and a measuring device including a plate formed with a pocket movable into and out of registration with said opening, means for packing the matter in said pocket, and means for forcing the matter in the pocket through the outlet opening when said pocket and outlet opening are in alinement, substantially as and for the purpose specified.

30. In a machine of the class described, means for holding capsule parts, and filling mechanism comprising a receptacle for the matter to be contained in the capsule, the receptacle having an outlet opening, and a movable plate in the receptacle having a series of pockets movable successively into and out of registration with said opening, substantially as and for the purpose set forth.

31. In a machine of the class described, means for holding capsule parts, filling mechanism comprising a receptacle having an outlet opening in its bottom, an intermittently actuated rotatable plate on the bottom of the receptacle and having pockets movable successively into registration with said opening, substantially as and for the purpose described.

32. In a machine of the class described, means for holding capsule parts, filling mechanism comprising a receptacle having an outlet opening in its bottom, and an intermittently actuated rotatable plate on the bottom of the receptacle and having pockets movable successively into registration with said opening, and a plunger for forcing the matter in a pocket through the outlet opening when said pocket is alined with said opening, substantially as and for the purpose specified.

33. In a machine of the class described, means for holding capsule parts, filling mechanism comprising a receptacle having an outlet opening in its bottom, an intermittently actuated rotatable plate on the bottom of the receptacle and having pockets movable successively into alinement with said opening, and a shield arranged to prevent matter from feeding from the receptacle through the alined pocket and outlet opening, substantially as and for the purpose set forth.

34. In a machine of the class described, means for holding capsule parts, filling mechanism comprising a receptacle having an outlet opening in its bottom, an intermittently actuated rotatable plate on the bottom of the receptacle and having pockets movable successively into alinement with said opening, a tube alined with said opening, the plate being movable between the lower end of the tube and said opening, and the tube being formed with a shield at its lower end, and a plunger movable in the tube through the alined pocket and outlet opening, substantially as and for the purpose described.

35. In a machine of the class described, means for holding capsule parts, filling mechanism comprising a receptacle for the matter to be contained in the capsule, and means for controlling the feeding of such matter from the receptacle, means for actuating the former means, and means movable with the former means and governed by the capsule part about to be filled for controlling the operation of the feeding means, substantially as and for the purpose specified.

36. In a machine of the class described, means for holding capsule parts, filling mechanism comprising a receptacle for the matter to be contained in the capsule, means for controlling the feeding of the matter from the receptacle, means for forcing such matter from the feeding means, actuating means connected to the forcing means to actuate the same during each operation of the machine, and means movable with the forcing means and governed by the capsule part about to be filled for controlling the operation of the feeding means, substantially as and for the purpose set forth.

37. In a machine of the class described, means for holding capsule parts, filling mechanism comprising a receptacle for the matter to be contained in the capsule, the receptacle having an outlet opening, means for controlling the feeding of such matter from the receptacle, means for forcing the matter from the feeding means, means for actuating the feeding means and the forcing means, the actuating means being connected to the forcing means to actuate the same during each operation of the machine, and means movable with the forcing means and governed by the capsule part about to be filled for controlling the operation of the feeding means, substantially as and for the purpose described.

38. In a machine of the class described, means for holding capsule parts, filling mechanism comprising a receptacle for the matter to be contained in the capsule, the receptacle having an outlet opening, means for controlling the feeding of such matter from the receptacle through such opening, a reciprocating element including a plunger for forcing the matter from the feeding means through said opening, actuating means connected to the feeding means and to the reciprocating element to actuate said element during each operation of the machine, and means governed by the capsule part about to be filled for controlling the operation of the feeding means, the governing means including a member carried by, and movable relatively to, the reciprocating element, substantially as and for the purpose specified.

39. In a machine of the class described, means for holding capsule parts, filling mechanism comprising a receptacle having an outlet opening in its bottom, and an intermittently actuated rotatable plate on the bottom of the receptacle, the plate having pockets movable successively into registration with said opening, a ratchet wheel arranged concentric with said plate and below the bottom of the receptacle, a pawl coacting with the ratchet wheel and normally engaged therewith, an oscillating arm concentric with the ratchet wheel, the arm carrying the pawl, actuating means connected to said arm to oscillate the same, a shifter for engaging the pawl and moving the same out of engagement with the ratchet wheel, a reciprocating element having a plunger movable in the receptacle and through the alined pocket and outlet opening, said element being connected to the actuating means to be moved thereby during each operation of the machine, governing means including a support carried by the element outside of the receptacle, and a governing member carried by the support and movable relatively thereto, the governing member and the shifter having portions arranged on opposite sides of the holding means, and the governing member being arranged to move through the empty space of the holding means in position to support a capsule part about to be filled, into coöperation with said shifter, and being prevented from engaging the shifter by the capsule part when in position about to be filled, means carried by said arm for resetting the shifter in its normal position, and means for returning the pawl into engagement with the ratchet wheel for the next oscillation of said arm, substantially as and for the purpose set forth.

40. In a machine of the class described, means for holding a pair of capsule parts, filling mechanism for the matter to be contained in the capsule, and means governed by both capsule parts for controlling the operation of said mechanism, substantially as and for the purpose described.

41. In a machine of the class described, means for holding a pair of capsule parts, filling mechanism for the matter to be contained in the capsule, said mechanism including a movable part, means governed by both capsule parts for controlling the operation of said movable part, and the controlling means including a pair of governing members arranged to normally engage the pair of capsule parts, and either governing member being arranged to be restrained from movement into connection with the controlling means by the corresponding capsule part, or to move through the empty space of the holding means into connection with the controlling means, substantially as and for the purpose specified.

42. In a machine of the class described, means for holding the capsule parts, sealing mechanism comprising a member movable into and out of engagement with one of the capsule parts, about to be sealed, actuating means, and means governed by the capsule parts about to be sealed for controlling the operation of said member by the actuating means, substantially as and for the purpose set forth.

43. In a machine of the class described, means for holding the capsule parts in pairs, sealing mechanism comprising a movable moistener, actuating means, and means governed by the capsule part of one pair about to be sealed for controlling the operation of the moistener by the actuating means, substantially as and for the purpose described.

44. In a machine of the class described, means for holding pairs of capsule parts, sealing mechanism comprising a movable member, actuating means connected to said member to move the same and to move independently thereof when said member is held from movement, a lock for holding said member from movement, and means governed by the capsule parts about to be operated on by said mechanism for controlling the operation of the lock, substantially as and for the purpose specified.

45. In a machine of the class described, means for holding capsule parts, sealing mechanism comprising a movable moistener, actuating means connected to the moistener to move the same, and to move independently of the moistener when the moistener is held from movement, means for holding the moistener from movement, and means governed by the capsule parts about to be sealed for controlling the operation of the holding means, the controlling means comprising governing members connected to the actuating means to be actuated thereby and to move relatively to the actuating means, the governing members being arranged to engage respectively with the capsule parts about to be sealed, and each governing member being arranged to pass through the empty space or spaces of the holding means when no capsule part or parts are in position to be sealed, substantially as and for the purpose set forth.

46. In a machine of the class described, means for holding capsule parts, mechanism for acting on said parts to complete the capsule comprising a movable member, actuating means connected to said member to move the same and to move independently of said member when said member is held from movement, locking means for holding said member from movement, and means governed by the capsule parts about to be acted on by said member for controlling the operation of the locking means, the controlling means comprising a catch located to normally engage and hold the locking means out of operative position, a support movable toward and from the holding means, and governing members movably carried by the support, the governing members and the catch being located on opposite sides of the holding means, and the governing members being movable through the empty spaces of the holding means normally occupied by the capsule parts about to be acted on, and into connection with the catch for releasing the locking means, and said governing members engaging the capsule parts in position to be acted on and thereby prevented from moving into engagement with the catch, substantially as and for the purpose described.

47. In a machine of the class described, means for holding capsule parts, mechanism for acting on said parts comprising a movable member, an intermittently actuated supporting element for said member, actuating means connected to said element to move the same upon each operation of the machine, said element being movable relatively to said member when said member is held from movement, means for locking said member from movement, means governed by the capsule parts about to be acted on by said member for controlling the operation of the locking means into operative position, and means operable during each operation of the machine for returning the lock to its normal position, substantially as and for the purpose specified.

48. In a machine of the class described, an intermittently actuated carrier for capsule parts, mechanism for acting on said parts on the carrier including a member operable during the stoppings of the carrier, a movable supporting element for said member, actuating means connected to said element and to the carrier to intermittently actuate the carrier and said element, and said member being connected to its supporting element to permit movement of the supporting element relatively thereto when said mechanism is held from movement, locking means for holding said member from movement, means governed by the capsule parts about to be acted on, for controlling the operation of the locking means, and a lever for returning the locking means to its normal position after each release thereof, the lever having an arm arranged in the path of the intermittently actuated carrier to be actuated thereby, substantially as and for the purpose set forth.

49. In a machine of the class described, an intermittently movable carrier for capsule parts, mechanism for acting on capsule parts on the carrier including a movable member, a supporting element for said member, actuating means connected to the carrier and said member to actuate the same, the member being mounted on the supporting element to permit movement of the supporting element relatively thereto when said member is held from movement, locking means for holding said member from movement including a depending pivoted arm normally arranged out of the vertical plane and movable into the vertical plane upon the release thereof into engagement with said member to prevent movement thereof, means governed by the capsule parts about to be acted on for controlling the pivotal movement of the locking means, the controlling means including a catch normally holding the locking means out of the vertical plane, and means operated by the carrier upon each operation thereof for returning the locking means from the vertical plane into engagement with the catch, substantially as and for the purpose described.

50. In a machine of the class described, means for holding capsule parts, sealing mechanism comprising a spring pressed moistener, a reciprocating supporting element connected to the moistener and controlling the movement thereof under the action of the spring when moving in one direction, and acting to tension the spring from moving in the opposite direction, and actuating means connected to the reciprocating element, substantially as and for the purpose specified.

51. In a machine of the class described, means for holding capsule parts, sealing mechanism comprising a spring pressed moistener, a reciprocating element connected to the moistener and controlling the movement thereof under the tension of its spring when moving in one direction and acting to tension the spring when moving in the opposite direction, actuating means connected to the reciprocating element, and means governed by the capsule parts about to be moistened for controlling the operation of the moistener, substantially as and for the purpose set forth.

52. In a machine of the class described, sealing mechanism comprising a moistener, and means for preventing the capsule parts from adhering to the moistener, substantially as and for the purpose described.

53. In a machine of the class described, sealing mechanism comprising a reciprocating moistener, a spring pressed pusher normally projecting from the moistener in advance thereof to engage the capsule parts to be moistened in advance of the moistener and arranged to yield as the moistener approaches the capsule parts and to hold said parts from adhering to the moistener as the moistener recedes from the capsule parts, substantially as and for the purpose specified.

54. In a machine of the class described, means for holding capsule parts, filling mechanism for the matter to be contained in the capsule, including a movable element, actuating means connected to said element to constantly actuate the same, means for controlling the operation of said mechanism, said means being carried by said element and arranged to be governed by the capsule part about to be filled, and sealing mechanism including a part operated by said element, substantially as and for the purpose set forth.

55. In a machine of the class described, an intermittently actuated carrier for holding capsule parts, filling mechanism for the matter to be contained in the capsule, a reciprocating element, actuating means connected to the carrier and to said element, sealing mechanism connected to said element to be actuated thereby, means for controlling the operation of the filling and sealing mechanism, said means being carried by the movable element and including members governed in their operation by the capsule parts about to be filled and sealed, substantially as and for the purpose described.

56. In a machine of the class described, an intermittently actuated carrier for capsule parts, filling mechanism for the matter to be contained in the capsule including an intermittently actuated part, a movable supporting element, actuating means connected to said element and to the carrier to actuate the same upon each operation of the machine, clutch members connected respectively to the movable part of the filling mechanism and to the actuating means, one clutch member being shiftable out of engagement with the other and being normally engaged therewith, a shifter for moving the movable shiftable element out of operative position, sealing mechanism including a moistener movable with, and relatively to, said element, means for controlling the movement of the shifter and the moistener, including governing members, the governing members and the shifter being arranged on opposite sides of the carrier and the governing members being carried by said element and capable of permitting movement of said element relatively thereto and being movable by said element through the empty space or spaces of the carrier in position to hold capsule parts in position about to be filled and sealed, and into coöperation with the shifter to operate the same and to engage the capsule parts on the carrier in position about to be filled and sealed, a lock for holding the moistener from movement with said element, the lock being normally out of operative position and coacting with the shifter and being released upon the movement of the shifter by the governing means, and means for resetting the shifter and the lock in their normal position at the end of each operation, substantially as and for the purpose specified.

57. In a machine of the class described, filling mechanism comprising a receptacle having an outlet opening, and means for controlling the feeding of matter from the receptacle including an intermittently operated member, and a lock for holding said member in its position assumed at the end of each intermittent movement, substantially as and for the purpose set forth.

58. In a machine of the class described, filling mechanism comprising a receptacle having an outlet opening, means for controlling the feeding of matter from the receptacle, the feeding means including an intermittently actuated member, a part movable with said member and formed with sockets, a sliding bolt movable into and out of the sockets, the bolt being movable into one socket at the end of each intermittent movement of said member, and actuating means for said part and said bolt, substantially as and for the purpose described.

In testimony whereof, we have hereunto signed our names in the presence of two attesting witnesses, at Syracuse, in the county of Onondaga, in the State of New York, respectively, the 4th and 9th days of October, 1912.

RUFUS E. SMITH.
FRANK E. CABLE.

Witnesses to signature of applicant Smith:
 FREDERIC G. BODELL,
 L. M. BURTON.
Witnesses to signature of applicant Cable:
 CHAS. C. YOUNG,
 S. DAVIS.

Copies of this patent may be obtained for five cents each, by addressing the "Commissioner of Patents, Washington, D. C."